United States Patent Office 3,567,290
Patented Mar. 2, 1971

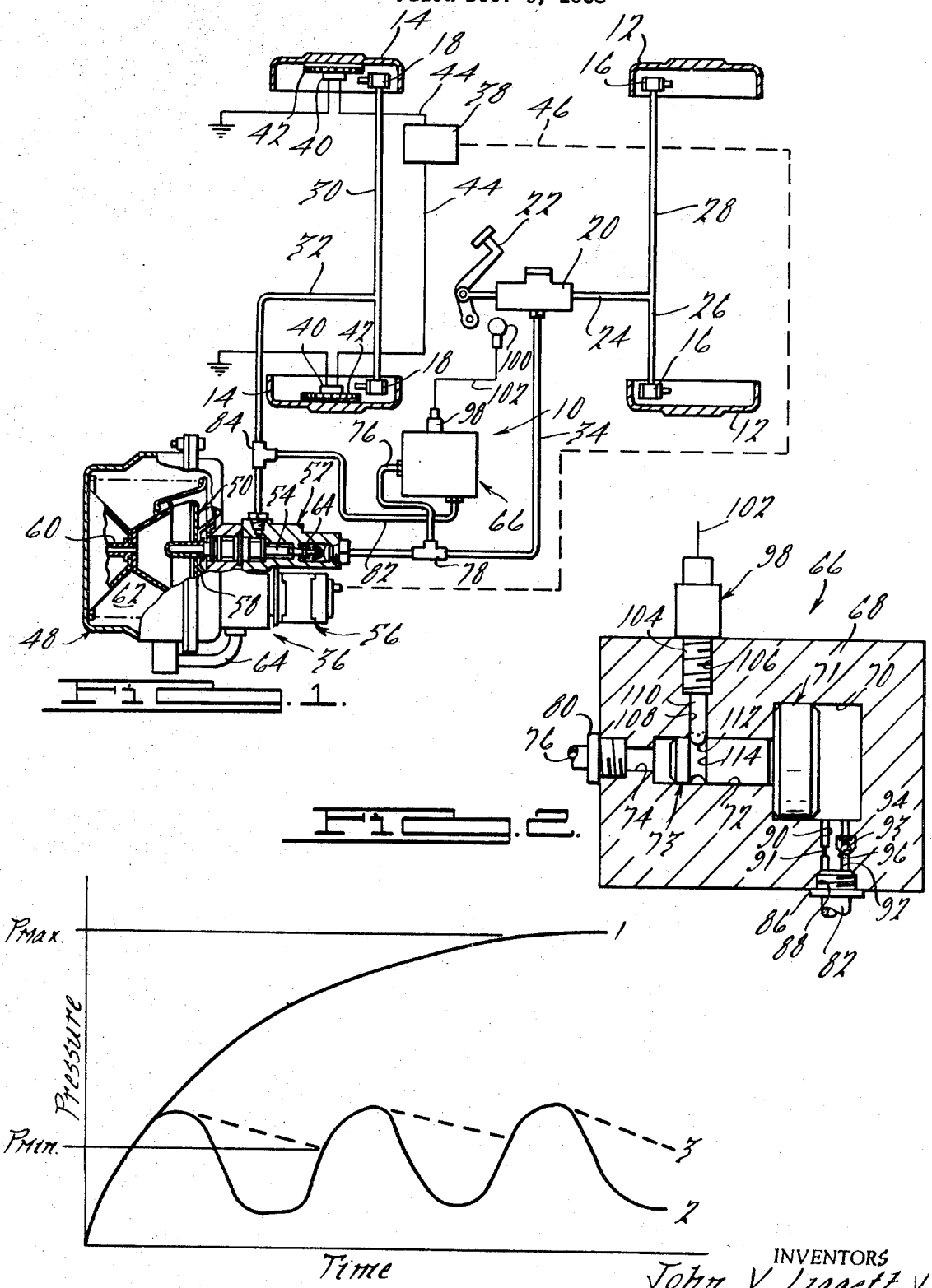

3,567,290
FAILURE INDICATING DEVICE FOR SKID CONTROL SYSTEM
John V. Liggett, Westland, and Frank L. Moncher, Farmington, Mich., assignors to Kelsey-Hayes Company, Romulus, Mich.
Filed Dec. 9, 1968, Ser. No. 782,388
Int. Cl. B60t 8/06, 17/22
U.S. Cl. 303—21                                      9 Claims

ABSTRACT OF THE DISCLOSURE

In a skid control system for controlling the fluid pressure applied to the brakes of at least one wheel of a wheeled vehicle from a source of brake actuating fluid and comprising modulating means having fluid inlet and outlet portions for controlling the magnitude of the brake actuating fluid supply to the brakes, the improvement comprising sensing means for sensing the differential pressure conditions between the fluid inlet and outlet portions of the modulating means, and indicating means providing a signal for the vehicle operator to indicate actuation of the sensing means.

BACKGROUND OF THE INVENTION

Under certain road conditions, application of maximum braking pressure, and frequently less than maximum pressure, of automobile and similar type vehicular braking systems, results in skidding and a locked-in wheel and/or skid condition. It is, of course, well established that when the wheels of the vehicle are locked or are skidding excessively, the coefficient of friction between the vehicle wheels and a surface of the road over which the vehicle is travelling can decrease, and the effectiveness of the vehicle braking system in decelerating and stopping the vehicle can be substantially reduced. This is especially true for low coefficient of friction road surfaces. It has been theorized that the maximum coefficient of friction, and hence the optimum braking efficiency, can be achieved when the vehicle wheels, instead of being in a totally locked or non-rotatable condition, are permitted to slip or partially rotate between 10 and 20%.

Generally speaking, the present invention relates to a vehicle skid control system which is adapted to function in selectively controlling the vehicle braking system such that the operative characteristics thereof simulate, as closely as possible, the ideal braking pressures at which the vehicle may be decelerated and stopped in the minimum amount of time. More particularly, the present invention relates to a skid control system of the type which utilizes a control or modulating type valve assembly that functions to selectively control the flow of hydraulic brake actuating fluid from the brake master cylinder of the vehicle braking system to the various brake wheel cylinders. Such modulating valve assemblies comprise fluid inlet and outlet portions, the former of which is communicable with the brake master cylinder, while the latter is connected to one or more of the wheel cylinders. Specifically, the present invention is directed toward a novel indicating device which is adapted to be operatively associated with the modulating valve, and in particular, be communicable with the fluid inlet and outlet portions thereof, and operate in a manner such that when the differential pressure conditions between the fluid inlet and outlet portions of the modulating valve exceeds a predetermined magnitude, such as would occur when the modulating valve is malfunctioning for any reason, an indicating means in the form of a signal light or the like, is energized so as to provide the vehicle operator with a visual indication of the existence of a malfunction in the modulating valve assembly.

SUMMARY OF THE INVENTION

This invention relates generally to vehicular skid control systems and, more particularly, to a novel failure indicating device for skid control systems of the type utilizing modulating valves of the type adapted to control the flow of brake actuating fluid supplied from the master cylinder to the various wheel cylinders of the vehicle.

It is accordingly, a general object of the present invention to provide a new and improved failure indicating device for skid control systems.

It is a more particular object of the present invention to provide a new and improved failure indicating device for providing a visual or similar signal to a vehicle operator of a malfunction occurring in the modulating or control valve assembly of a skid control system.

It is another object of the present invention to provide a new and improved failure indicating device of the above character which is adapted to sense the differential fluid pressure conditions between the fluid inlet and outlet portions of an associated modulating valve.

It is another object of the present invention to provide a new and improved failure indicating device of the above type which utilizes a pair of differential size pistons, the larger of which is adapted to be communicable with the outlet side of the associated modulating valve, while the smaller of which is communicable with the inlet side of the associated valve assembly.

It is still another object of the present invention to provide a failure indicating device of the above described type which utilizes an indicating light or the like, for sensing movement of the aforesaid pistons in response to the differential pressure conditions between the inlet and outlet portions of the associated modulating valve assembly.

It is a further object of the present invention to provide a failure indicating device which is of an extremely simple design, is easy to assemble and economical to commercially manufacture.

Other objects and advantages of the present invention will become apparent from the following detailed description taken in conjunction with the accompanying drawing.

BRIEF DESCRIPTION OF THE DRAWING

FIG. 1 is a schematic diagram of a typical skid control system having the failure indicating device of the present invention in operative association therewith;

FIG. 2 is a transverse cross-sectional view through the failure indicating device incorporating the basic principles of the present invention; and FIG. 3 is a graphical representation of the brake fluid pressure versus time of the brake actuating fluid communicated to the wheel cylinders of the associated vehicle when the vehicle is provided with a skid control system of the type schematically illustrated in FIG. 1.

DETAILED DESCRIPTION OF THE INVENTION

General description of environment and function

Generally speaking, FIG. 1 is a schematic diagram of a skid control system, designated by the numeral 10, which has the failure indicating device of the present invention in operative association therewith. The skid control system 10 is shown in association with a vehicular braking system including front and rear brake drums 12 and 14 and associated front and rear brake cylinders 16 and 18, respectively. The skid control system 10, although being adapted to be operatively associated with either pair of front and rear wheel cylinders 16 and 18, or with both pairs thereof, for purposes of simplicity of description, is shown and described in operative association with only the rear wheel cylinders 18. The aforesaid braking system also comprises a master cylinder assembly 20 which is operable in response to actuation of a conventional brake pedal 52 to communicate hydraulic braking fluid therefrom through fluid conduits or lines 24, 26 and 28 to the front wheel cylinders 16. The rear wheel cylinders 18 are operatively connected by means of a common fluid conduit or line 30, which is in turn connected through fluid conduit 32 to the skid control system 10. The master cylinder 20 is connected to the skid control system 10 through a suitable fluid conduit or line 34. It will be noted that the vehicle brakes associated with the brake drums 12, 14 may be of conventional design, the construction and operation of which are well known in the art, and hence the details thereof are omitted for purposes of simplicity of description.

The skid control system 10 generally comprises a modulating valve assembly 36 that is actuable in accordance with and in response to an electrical signal produced by an electrical control module 38. The module 38 receives information from sensing means, such as sensors 40 associated with each of the brake drums 14, for example, through suitable exciter rings 42. The exciter rings 42 and sensors 40 may be of any construction well known in the art, and since these members constitute no material part of the present invention, the specific details concerning the construction and operation thereof have been omitted. By way of example, the exciter rings 42 may be of a toothed construction and the sensors 40 may be of a permanent or electromagnetic construction which together define a variable reluctance pickup. During normal operation of the associated vehicle, the exciter rings 42 would be rotated concomitantly with the brake drums 14, and hence simultaneously with the associated vehicle wheels, and by virtue of their toothed construction, the rings 42 would, via the sensors 40, produce electrical signals which are transmitted through associated conductors 44 to the control module 38, thus providing a signal to the module 38 responsive to the rotational velocity of the vehicle wheels associated with the brake drums 40.

The control module 38 is designed and constructed to sense the rate of change in the signals received through the conductors 44 and hence to sense the rate of deceleration of the wheels associated with the brake drums 14, and to produce an output signal responsive to the magnitude of the deceleration of the wheels associated with the drums 14, reaching a preselected magnitude corresponding to a skid condition existing or about to occur at said wheels. The output or control signal is adapted to be transmitted from the control module 38 through a suitable conductor 46 to the modulating valve assembly 36. The control module 38 can provide merely an "on" or "off" signal and modulation of the fluid pressure to the brake cylinders 18 will be provided by the valve assembly 36. Alternatively, fluid pressure to the vehicle brakes may be varied in response to an electrical signal originating from the module 38 of varying magnitude; however, varying or controlling the fluid pressure by the valve assembly 36 in response to a signal of substantially constant amplitude permits the remainder of the skid control system 10 to be considerably simplified.

Although the modulating valve assembly 36 may be of various constructions, and be hydraulically, pneumatically, electrically or otherwise actuated, in the embodiment illustrated in FIG. 1, said assembly 36 comprises a vacuum chamber housing 48 divided by an interior diaphragm assembly 50. A hydraulic cylinder housing 52 is mounted on the housing of the vacuum chamber and has slidably located therein a hydraulic piston 54 which is mechanically linked to the diaphragm assembly 42. Mounted to one side the hydraulic cylinder housing 44 is a solenoid mechanism 56 which is communicable with the conductor 46 and whose plunger (not shown) seats itself over an atmospheric air inlet port to selectively control the introduction of atmospheric air pressure to one side 58 of the vacuum chamber housing 48 when no skid control is required. The vacuum housing chamber 48 is held at vacuum through engine (not shown) vacuum via an engine vacuum line 60 which communicates to the opposite side 62 of the diaphragm assembly 50 from the side 58 thereof. A conduit 64 and a normally opened vacuum port communicates the side 58 to vacuum. When the control module 38 provides an output signal indicating a skid condition, energization of the solenoid mechanism 56 occurs, and the solenoid plunger is unseated from the atmospheric air inlet port, allowing atmospheric air pressure to enter the opposite side 58 of the chamber housing 48. At the same time, the vacuum port is closed by the actuation of the solenoid mechanism 56. With the differential pressure thus created, the diaphragm assembly 50 is moved, permitting the hydraulic piston 54 to move. As the piston 54 moves, the available volume within the hydraulic cylinder housing 52 increases, and at the same time a check valve 64 is seated, cutting off any further application of master cylinder pressure to the brakes of the wheels being skid controlled. The brake cylinder pressure which has already been built up will be relieved by virtue of the increased volume created in the hydraulic cylinder housing 52 due to the movement therefrom of the hydraulic piston 54. With relief of brake cylinder pressure, the associated wheels will be permitted to spin up or increase in speed.

At such time as the wheels have rotated a preselected amount, the control module 38 will terminate its output signal, with the result that the solenoid mechanism 56 will be deenergized, allowing the plunger of the solenoid mechanism 56 to again block the ingress of atmospheric air, and open the vacuum port to the side 58. In this condition, the piston 54 and diaphragm assembly 50 return to their original positions wherein the check valve 64 is unseated, permitting master cylinder pressure to again be applied through the modulating valve assembly 36 directly to the brake cylinders 18. A more detailed description of the construction and operation of the modulating valve assembly 36 will be seen in United States Letters Patent application, Ser. No. 642,861, filed June 1, 1967, now abandoned for Skid Control System Including Hydraulic Modulating Valve, assigned to the assignee of the present application and incorporated herein by reference as a descriptive portion of this application. It will be noted that the modulating valve assembly 36 is shown in operative association with the failure indicating device of the present invention merely to show a typical operational environment for said device, and that the present invention is not intended to be limited in any way to the construction and operation of the particular modulating valve assembly 36 described herein, since the device of the present invention will find useful application with virtually all types of fluid pressure modulating devices that control the fluid pressure between an inlet portion, such as the hydraulic cylinder housing 52 communicable with the hydraulic line 34, and an outlet portion communicable through hydraulic line 32 with the rear wheel cylinders 18.

Generally speaking, the failure indicating device of the present invention is designed to sense the existence of a malfunction in the modulating valve assembly 36 and provide a signal for the vehicle operator of the presence of such a malfunction. The signal may be in various forms, such as an audible or visual signal provided by a buzzer or signal light on the vehicle instrument panel; however, in the embodiment illustrated herein, the indicating device provides a visual signal such as, for example, through a signal light which is adapted to illuminate upon actuation of the indicating decive, as will hereinafter be described.

Referring now in detail to the failure indicating device incorporating the principles of the present invention, as best seen in FIGS. 2 and 3 of the drawing, the device is generally designated by the numeral 66 and is shown as comprising an external housing or enclosure 68. The housing 68 is formed with a cylindrical bore 70 within which a piston member 71 is slidably or reciprocally disposed. Arranged coaxially of the bore 70 is a somewhat smaller diameter bore 72 within which a piston 73 is slidably or reciprocally disposed. Although the pistons 71, 73 are illustrated herein as comprising two separate members, they may, for all practical purposes be integrally connected to one another.

The housing 68 is formed with an inlet passage 74 that is communicable at its inner end with the interior of the bore 72 and is communicable at its outer end with a fluid line or conduit 76 that is connected by means of a conventional T-fitting or the like 78 with the fluid conduit 34. The conduit 76 is secured to the housing 68 by means of a suitable fluid fitting 80 mounted in the outer end of the passage 74. A fluid line or conduit 82 is connected through a suitable T-fitting 84 with the conduit 32 and is connected to the housing 68 by means of a suitable fluid fitting 86 that is fixedly mounted within an annular threaded recess 88. The recess 88 is communicable with the interior of the bore 70 through a bore or passage 90 which is formed with a restricted portion or orifice 91 therein. The recess 88 is also communicable through a second bore or passage 92 with the interior of the bore 70, the passage 92 being provided with a spherical check valve or the like 93 which is urged into engagement by means of a suitable spring or the like 94 with a valve seat 96 defined within the passage 92.

Mounted on the housing 68 is a switch assembly 98 that is adapted to effect actuation or energization of an indicating means, such as for example, an indicating light 100 that may be mounted on the instrument panel of the associated automotive vehicle. The switch assembly 98 is connected through conductor 102 with the light 100 and comprises a mounting shank section 104 adapted to be threadably mounted within a counterbore 106 formed at the upper end of a downwardly extending passage 108 in the housing 68. Slidably mounted within the assembly 98 and depending downwardly therefrom through the passage 108 is an actuating plunger 110, the lower end of which is formed with a camming surface 112 which is adapted to be spring biased into engagement with an annular recess or groove 114 formed around the piston 73. The switch assembly 98 may be of any suitable commercial construction well known in the art and adapted to be actuated upon upward movement of the plunger 110, with such upward movement of the plunger 110 resulting in completion of an electrical circuit to the light 100 to effect illumination thereof. As will hereinafter be described in detail, the camming surface 112 is normally engaged with the recess 114, as shown by the solid line position in FIG. 2, whereby the electrical circuit to the light 100 is open so that the light 100 is not illuminated; however, at such time as the piston 73 moves toward the right in FIG. 2, the plunger 110 will be biased upwardly to the phantom position shown in FIG. 2, at which time the assembly 98 will complete a circuit to the light 100 to effect illumination thereof. Preferably the assembly 98 is designed such that the circuit to the light 100 remains closed or completed once the assembly 98 is actuated so that the light 100 remains "on" to continuously apprise the vehicle operator of any malfunction that may be occurring in the skid control system 10. After the malfunction has been corrected, the assembly 98 may be reset in any conventional manner so that it may again be actuated upon proper movement of the piston 73.

It will be noted that the construction of the check valve 93 and restricted orifice 91 may be varied somewhat without departing from the principles of the present invention. Moreover, the check valve 93 and restricted orifice 91 may be combined in any suitable manner wherein a one way valve is provided for controlling fluid flow from the conduit 82 into the bore 70, and such that a restricted passageway is provided from the bore 70 back into the conduit 82. An alternate construction of the check valve is shown and described in United States Letters Patent application Ser. No. 702,095, filed Jan. 31, 1968, now U.S. Pat. No. 3,495,882 for Skid Control System Including Hydraulic Modulating Valve Having a Modified Check and Bleed Valve, and assigned to the assignee of the present application, and which is incorporated by reference herein as a descriptive portion of this application.

The failure indicating device 66 is designed to monitor the fluid input-output relation of hydraulic brake actuating fluid passing through the modulating valve assembly 36, and more particularly, is adapted to sense the differential pressure conditions between the inlet portion of the assembly 36 and the output portion thereof, i.e., the difference in pressure between the conduits 34 and 32. When this differential pressure exceeds a predetermined amount, the switch assembly 98 will become actuated to give a visual indication that some malfunction exists in the modulating valve assembly 36. It is important to note that since it is the function of the assembly 36 to vary the hydraulic pressure to the brake cylinders 18 in order to achieve skid control, the failure indicating device 66 must be insensitive to this phenomenon so as to not give a malfunction indication prematurely.

FIG. 3 illustrates various hydraulic cycles that may occur in the modulating valve assembly 36. Under conditions when no skid control is necessary or occurs, at such time as the brake pedal 22 is actuated, the input and output pressure from the assembly 36 are equal and follow some path such as the curve number 1 in FIG. 3. Since the output of the assembly 36 is connected to the bore 70 through the conduit 82 and the input of the assembly 36 is connected to the bore 72 through the conduit 76, even though the fluid pressure is the same, a larger force will be exerted against the piston 71 than against the piston 73, due to the larger size of the piston 71. Accordingly, the pistons 71, 73 will remain in their respective positions shown in FIG. 2 during normal operation of the brake system of the vehicle. At such time as a skid control cycle occurs, the output pressure of the modulating valve assembly 36 follows a generally sinusoidal path such as as depicted by the curve 2 in FIG. 3; however, the pressure within the bore 70 will follow a path such as indicated by the curve 3 in FIG. 3 due to the provision of the check valve 93 and restriction or orifice 91 that are interposed between the conduit 82 and the interior of the bore 70. The reason for this is that when the pressure within the output portion of the assembly 36 drops, the check valve 93 will close and the fluid trapped within the bore 70 will be forced to flow out of the bore 70 through the restriction or orifice 91, with the result that a somewhat higher pressure will remain within the bore 70 even though the pressure in the output portion of the assembly 36 drops. This somewhat larger pressure in the bore 70 will maintain the pistons 71, 73 in the position shown in FIG. 2 since the minimum pressure maintained with the bore 70 is sufficiently high to maintain a larger force on the piston 71, which is achieved through proper design of the relative piston sizes, as well as proper selection of the flow rate through the restriction 91. At such time as any failure or malfunction occurs in the modulating valve assembly 36, which results in a decrease in the pressure in the output portion thereof or conduit 32, the internal pressure within the bore 70 will drop below the pressure within the bore 72, i.e., when the differential pressure between the bores 70 and 74 exceeds a predetermined level, the larger pressure within the bore 72 will cause the pistons 71, 73 to be biased toward the right in FIG. 3, which results in the plunger 108 being forced upwardly out of the recess 114 to effectuate illumination of the failure indicating light 100 so that the vehicle operator will be informed of the presence of the malfunction.

A particular feature of the above described design resides in the fact that the provision of the check valve 93 and fluid restriction 91 render the failure indicating device 66 insensitive to hydraulic pressure variations which occur during normal operation of the modulating valve assembly 36 during a skid control cycle. Another feature of the present invention resides in the fact that the failure indicating device 66 is insensitive to voltage, temperature and other environmental factors, as well as the fact that the present design is devoid of any retaining springs or the like for positioning the pistons 71, 73, since proper positioning thereof will be achieved automatically during normal operation of the modulating valve assembly 36. It will be noted that the device 66 may be mounted at any convenient location, and preferably the housing 68 may be an integral part of the hydraulic cylinder housing 52 in order to simplify construction and assembly time and expenses. The failure indicating device 66 of the present invention will be seen to be of an extremely simple design and will thus be economical to manufacture and have a long and reliable operational life.

While it will be apparent that the preferred embodiment illustrated therein is well calculated to fulfill the objects above stated, it will be appreciated that the present invention is susceptible to modification, variation and change without departing from the proper scope or fair meaning of the subjoined claims.

What is claimed is:

1. In a skid control system comprising means for sensing the rate of deceleration of a wheeled vehicle and fluid modulating means having fluid inlet and outlet portions and responsive to the sensing means to control the fluid pressure applied to the brakes of at least one wheel of the vehicle from a source of brake actuating fluid, sensing means for sensing the differential pressure conditions between the fluid inlet and outlet portions of the modulating means, and indicating means providing a signal for the vehicle operator to indicate actuation of said sensing means, said sensing means including housing means defining first and second bores and first and second piston means slidably disposed within said bores, said indicating means being actuatable in response to movement of one of said piston means, the fluid pressure at said outlet portion of said modulating means acting against said first piston means and the fluid pressure at said inlet portion of said modulating means acting in the opposite direction against said second piston means, and pressure control means interposed between said outlet portion of said modulating means and said first piston means and including means for providing a differential pressure condition between said outlet portion of said modulating means and the pressure acting against said first piston means to resist movement of said first piston means and actuation of said indicating means during normal modulating operation of said modulating means.

2. The invention as set forth in claim 1 which includes fluid circuit means communicating the outlet portion of said modulating means with one of said bores in said housing means and check valve means and restricted orifice means in said circuit means for controlling the flow of fluid between said outlet portion of the modulating means and said one of said bores in said housing means.

3. The invention as set forth in claim 1 wherein said first and second piston means are of different diameter.

4. The invention as set forth in claim 3 wherein said indicating means is actuatable in response to movement of the smaller of said piston means.

5. The invention as set forth in claim 1 wherein said indicating means provides a visual indication of a differential pressure condition between the fluid inlet and outlet portions of the modulating means in excess of a predetermined magnitude.

6. In the method of indicating a malfunction in a skid control system comprising modulating means having fluid inlet and outlet portions and responsive to a control signal to control skidding of a vehicle upon application of the brakes thereof, the steps which include, sensing the rate of deceleration of the vehicle upon application of the brakes, producing a control signal responsive to the rate of deceleration, transmitting said signal to the modulating means, modulating the fluid pressure applied to the brakes of at least one wheel of the vehicle in response to said signal, sensing a differential pressure condition between the inlet and outlet portion of the modulating means in excess of a predetermined magnitude by applying the pressure at the outlet portion of the modulating means against one side of a first piston member and applying the pressure at the inlet portion of the modulating means in the opposite direction against one side of a second piston member, actuating an indicating means by preselected movement of one of the piston members, controlling the fluid pressure acting on the first piston member by providing a differential presssure condition between the outlet portion of the modulating means and the pressure acting against said first piston member to resist movement of said one piston member and actuation of said indicating means during normal modulating operation of said modulating means.

7. The method as set forth in claim 6 which includes the step of providing a visually discernible signal in response to a differential pressure condition between the fluid inlet and outlet portions of the modulating means in excess of a predetermined magnitude.

8. The method as set forth in claim 6 which includes the step of providing said differential pressure by selectively restricting fluid flow from said first bore to said outlet portion of said modulating means and thereby controlling the fluid pressure adjacent said first piston member to prevent a premature pressure drop in said first bore during fluid modulation of the outlet portion of the modulating means.

9. In a skid control system comprising modulating means having fluid inlet and outlet portions and adapted to control the fluid pressure applied to the brakes of at least one wheel of a wheeled vehicle from a source of brake actuating fluid.

sensing means for sensing the differential pressure conditions between the fluid inlet and outlet portions of the modulating means, indicating means providing a signal for the vehicle operator to indicate actuation of said sensing means, housing means defining first and second bores, first and second pistons of different diameters slidably disposed within said bores, the outlet portion of the modulating means being communicable with the larger of the pistons and the inlet portion of the modulating means being communicable with the smaller of the pistons, check valve means and restricted orifice means interposed between the outlet portion of the modulating means and said larger piston, said indicating means being actuatable in response to movement of said smaller piston, and said indicating means comprising visual indication means.

References Cited

UNITED STATES PATENTS

| | | | |
|---|---|---|---|
| 3,414,336 | 12/1968 | Atkin et al. | 303—21(F) |
| 3,441,318 | 4/1969 | Bueler | 303—84(A)X |
| 3,448,230 | 6/1969 | Bueler | 303—6(C)X |

GEORGE E. A. HALVOSA, Primary Examiner

JOHN J. McLAUGHLIN, Assistant Examiner

U.S. Cl. X.R.

188—151, 181; 303—6, 84